US007589615B2

(12) United States Patent
Keller, Jr. et al.

(10) Patent No.: US 7,589,615 B2
(45) Date of Patent: Sep. 15, 2009

(54) MULTI-FREQUENCY SECURITY CODE TRANSMISSION AND RECEPTION

(75) Inventors: Robert R. Keller, Jr., Chicago, IL (US); Keith Johnson, Orland Park, IL (US); Robert C. Markwart, Rolling Meadows, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 164 days.

(21) Appl. No.: 10/994,786

(22) Filed: Nov. 22, 2004

(65) Prior Publication Data

US 2006/0109078 A1 May 25, 2006

(51) Int. Cl.
*G06K 19/00* (2006.01)

(52) U.S. Cl. ...................... 340/5.64; 340/5.7; 340/5.72; 340/5.1; 340/5.2; 340/5.6; 340/5.61; 340/5.63; 340/5.65

(58) Field of Classification Search ................ 340/5.71, 340/5.64, 5.6, 5.7, 5.61, 5.1
See application file for complete search history.

(56) References Cited

U.S. PATENT DOCUMENTS

| | | | | |
|---|---|---|---|---|
| 2,292,387 | A | 8/1942 | Markey et al. | |
| 3,754,189 | A * | 8/1973 | Deming | 340/825.72 |
| 3,870,959 | A | 3/1975 | Wootton | |
| 5,519,381 | A * | 5/1996 | Marsh et al. | 340/10.2 |
| 5,549,113 | A | 8/1996 | Halleck et al. | |
| 5,680,134 | A * | 10/1997 | Tsui | 341/173 |
| 6,005,508 | A | 12/1999 | Tsui | |
| 6,181,255 | B1 | 1/2001 | Crimmins et al. | |
| 6,249,673 | B1 * | 6/2001 | Tsui | 455/92 |
| 6,384,710 | B1 * | 5/2002 | LeMense et al. | 340/5.62 |
| 6,822,603 | B1 | 11/2004 | Crimmins et al. | |
| 6,915,146 | B1 * | 7/2005 | Nguyen et al. | 455/702 |
| 2004/0092837 | A1 | 5/2004 | MacGregor | |

* cited by examiner

*Primary Examiner*—Vernal U Brown
(74) *Attorney, Agent, or Firm*—Fitch Even Tabin & Flannery

(57) ABSTRACT

A system is disclosed including a transmitter and receiver for the communication of security codes which may be validated at the receiver to operate equipment. In one embodiment, the transmitter transmits a security code at two frequencies contemporaneously to the receiver which may receive both frequencies and resolve the security code therefrom. The receiver may lock onto one frequency to the exclusion of the other frequency when parts of a security code are detected. In another embodiment, the transmitter selectively transmits security codes at a default frequency which is selected because of a recorded count of prior apparent successful transmission.

15 Claims, 5 Drawing Sheets

MULTI-FREQUENCY SECURITY CODE TRANSMISSION AND RECEPTION

FIELD OF THE INVENTION

The present invention relates to the transmission and reception of wirelessly transmitted control signals.

BACKGROUND OF THE INVENTION

Systems are known in which equipment activation signals are wirelessly transmitted to a receiver which responds thereto by activating the equipment. Such signals are used, for example, to allow remote unlocking or opening of a barrier separating a user from a protected or secure area. The transmitted signals generally include an access or security code which is analyzed by the receiver to identify whether the user causing the signal transmission has permission for access to the protected area.

Frequently, the wireless access signals are transmitted by means of a radio frequency (rf) carrier. In many cases, these systems are used in consumer products which dictate that costs and energy consumption are kept to a minimum. It has been discovered that such communication systems may, from time to time, lose their effectiveness due to interfering rf signal transmission by other more powerful transmitters. For example, a barrier movement operator such as a garage door operator, may transmit relatively low power rf signals including a security code to a barrier controller which responds thereto by selectively moving the barrier. One common frequency for the transmission of such security codes is 390 MHZ. Should a higher power rf transmitter be operating nearby at or nearly at the 390 MHZ frequency the receiver at the barrier movement operator may be overloaded and unable to respond properly to a transmitted security code. As should be apparent, this results in the user being unable to control the barrier with his or her remote security transmitter. Further, when the powerful transmitter operates, the inability to control the barrier may appear as an intermittent problem because sometimes the code transmission controls the barrier and sometimes it does not.

A need exists for a wireless code transmission and reception system which is less prone to interfering signal transmission.

BRIEF DESCRIPTION OF THE DRAWINGS

The invention will be more readily understood from the following description when read in conjunction with the drawing in which.

DESCRIPTION

Figure 1:
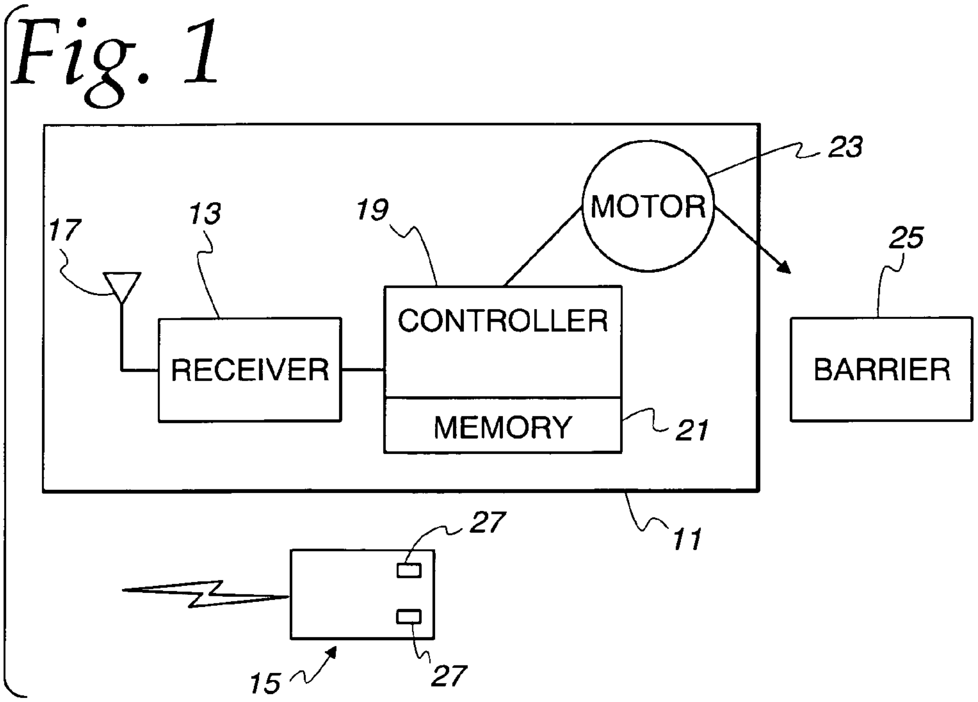
FIG. 1 is a block diagram of a barrier movement operator.

FIG. 1 is a functional block diagram of a security system gaining advantage of the principles described herein. The system of FIG. 1 uses rf transmitted security codes to control the position of a barrier such as a door, a gate or a garage door. From FIG. 1 it can be seen that the present system might also be used to control a lock on a door or barrier or the like.

FIG. 1 illustrates a barrier movement operator 11 which includes an rf receiver 13 which receives rf security code transmissions from a transmitter 15 via an antenna arrangement 17. In the present embodiment each transmission includes data identifying the security code, or portion thereof, and information such as a start and sync character to synchronize the receiver with the incoming message. The receiver detects the synchronizing information and the security code portion which is forwarded to a controller 19. The data in a transmission may include a number of digits or digit portions which are sequentially conveyed by the receiver 13 to the controller 19. Controller 19 receives the digits and digit portions from receiver 13 and analyzes them to determine from the received format whether a security code portion is in fact being received. The controller 19 then continues to accumulate the digits of a received security code. A received security code is then compared with one or more approved security codes which are stored in a memory 21 of the controller to determine whether approval should be given to the received security code. If such approval is given a motor 23 is energized to move a barrier 25 in a manner determined by the controller. It should be remembered that other actions such as unlocking a barrier could also be initiated by the controller 19.

Figure 2:
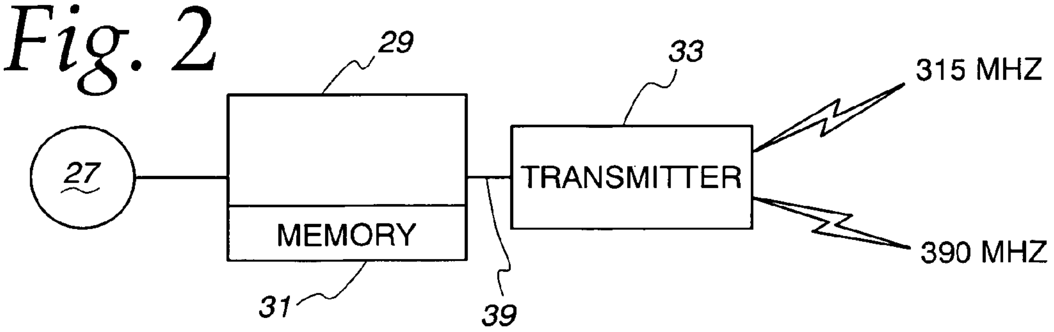
FIG. 2 is a block diagram of a transmitter of the type shown in FIG. 1.

In the present example, transmitter 15 is capable of transmitting each security code portion at at least two different rf frequencies. For the sake of understanding, the present example discusses the transmission of security codes at two frequencies, 390 MHZ and 315 MHZ. Other numbers of frequencies and other frequencies may be used in accordance with the principles discussed herein and the amount of redundancy desired. FIG. 2 represents a block diagram of a transmitter 15 which includes one or more push buttons 27 which signal to a controller 29 of the transmitter, that a security code is to be transmitted. Controller 29 then controls a transmitter 33 to send a security code stored in a transmitter memory 31 at the two frequencies 315 MHZ and 390 MHZ. Transmitter 33 responds to the control from controller 29 by contemporaneously rf transmitting security code portions at the two frequencies. The codes are said herein to be contemporaneously transmitted because they are sent during the same period of time, but transmission may not take place in lock step or synchronously, although such may be the case. Also, the security code is transmitted in portions each of which may include an entire security code or less than an entire security code in accordance with priority established formats. For example, a security code may comprise 40 trinary digits which are transmitted as two 20 digit security code portions to be accumulated at the receiver 13 and controller 19.

Figure 3:
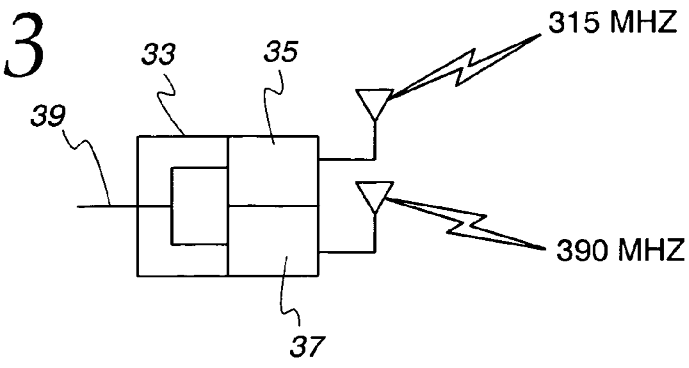
FIG. 3 is an illustration of an embodiment of a transmitter circuit for FIG. 2.

FIG. 3 is a block diagram of a multiple transmitter circuit transmitter 33. As shown in FIG. 3 transmitter 33 comprises two transmitter circuits each of which is configured to transmit security codes at a predetermined frequency. In FIG. 3 a transmitter circuit 35 is configured to transmit at 315 MHZ and a transmitter circuit 37 is configured to transmit security codes at 390 MHZ. To send a security code, controller 29 transmits the digits of the security code to transmitter 33 via a communication path 39 with appropriate timing for transmission. The security code on conductor 39 is applied to both transmitter circuits 35 and 37 and is thus, contemporaneously transmitted at 315 MHZ and 390 MHZ.

Figure 4:
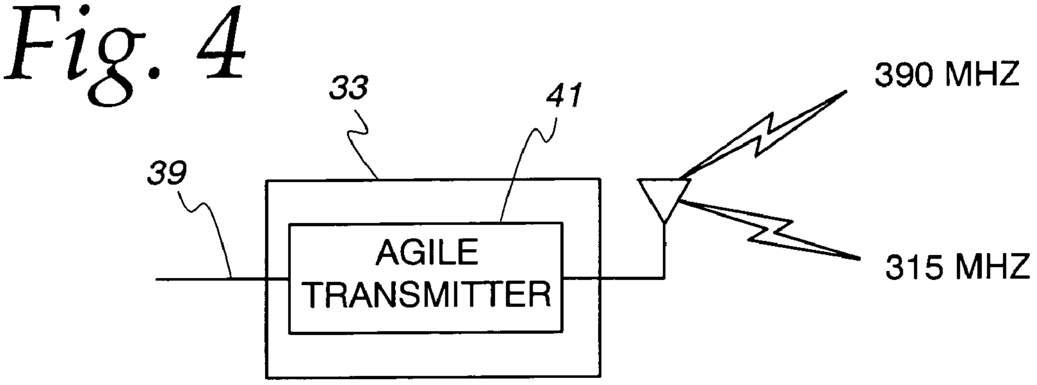
FIG. 4 is an illustration of another embodiment of a transmitter circuit for use in FIG. 2.

FIG. 4 illustrates a transmitter 33 which comprises a single frequency agile transmitter circuit 41 which is capable of transmitting security codes at multiple frequencies. When a security code is to be transmitted using the transmitter of FIG. 4, the controller pre sets the transmitter circuit via communication path 39 to transmit at a first rf frequency e.g., 315 MHZ and sends the digits of a security code portion to the configured transmitter circuit 41 via the same communication path. When the transmission at the first rf frequency is completed, the controller 29 controls the transmitter circuit 41 to transmit at the second rf frequency e.g., 390 MHZ and sends the security code portion to the so configured transmitter circuit 41.

Figure 5:
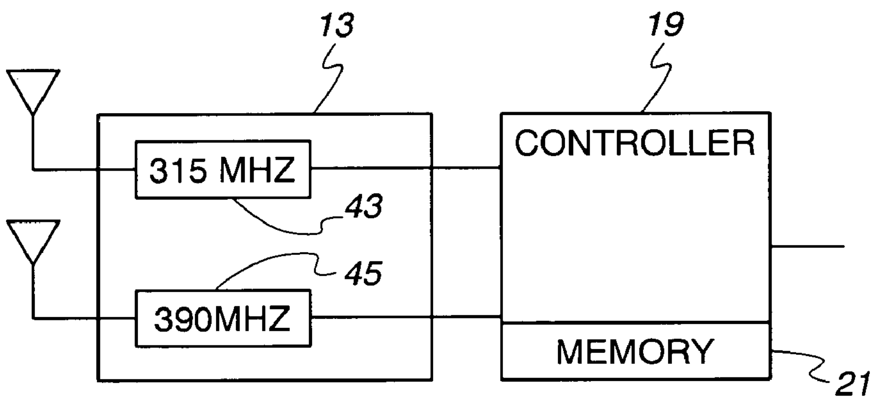
FIG. 5 is an illustration of an embodiment of a multi-frequency receiver circuit.
Figure 6:
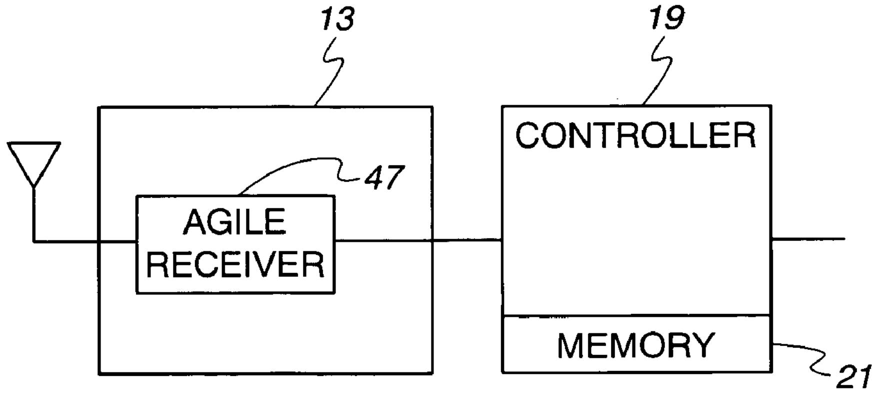
FIG. 6 is an illustration of another embodiment of a multi-frequency receiver circuit.

The receiver 13 is shown in block diagram form in FIGS. 5 and 6. The example of FIG. 5 includes a receiver 13 which comprises two fixed frequency receiver circuits 43 and 45. The controller 19 of barrier movement operator 11 periodically surveys reception by the receiver circuits 43 and 45 to determine whether a security code may be being received at their respective frequencies and, if so, controller 19 accumulates received security code digits. The receiver 13 of FIG. 6 includes one frequency agile receiver circuit 47 which may be periodically switched back and forth to receive security codes at the possible frequencies of reception. In the present example, receiver circuit 47 is alternatively switched between 315 MHZ and 390 MHZ to identify security codes at one or both of those frequencies.

Figure 7:
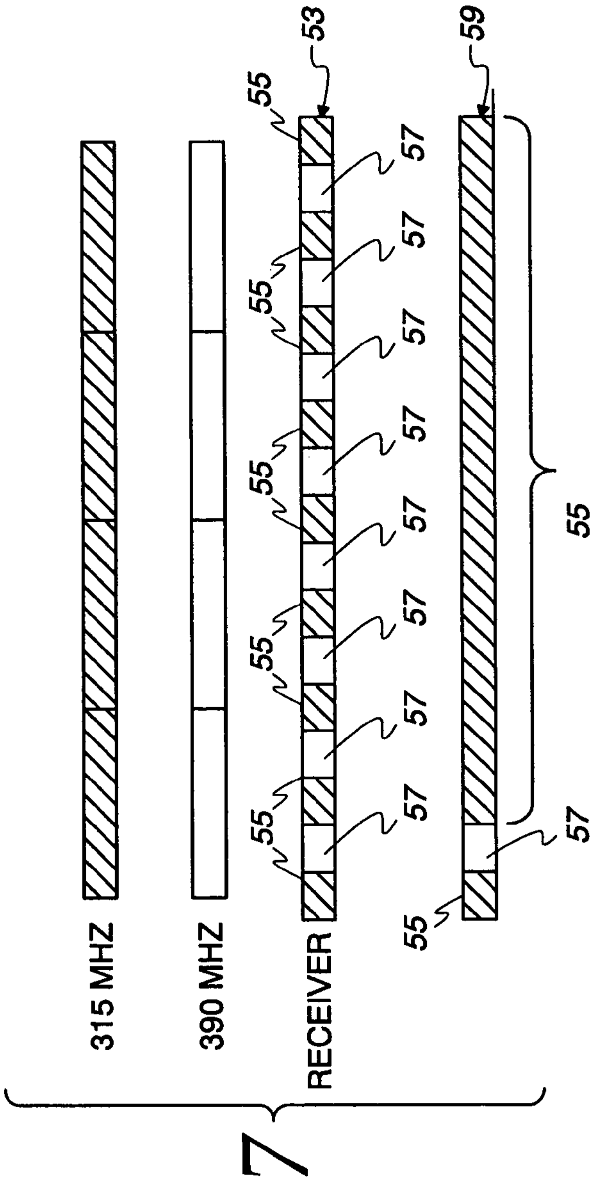
FIG. 7 is a graphical representation of the ref transmission and reception of security code portions.

FIG. 7 illustrates the operation of the transmitter and receiver to complete the sending and reception of security codes. The top line 49 of FIG. 7 represents the reception of security codes at 315 MHZ while the second line 51 represents the reception of security codes at 390 MHZ. As illustrated in line 49, the individual segments 50 represent security code portions as do the individual segments 52 of line 51. Transmission and reception at 315 MHZ (line 49) is given a cross-hatched appearance while transmission and reception at 390 MHZ is not and is represented as open space between segments. Line 53 represents the time during which the controller is detecting signals transmitted at the two frequencies on line 53 the time for detecting 315 MHZ signals is represented as cross hatched times 55 and the timing for detecting signals transmitted at 390 MHZ is represented as plane time segments 57. Controller alternates between the two frequencies and when appropriate digits are detected, it connects to the single frequency at which the digits were first detected to accumulate the transmitted security code portions. In this way, when one frequency is being interfered with, the security code at the other frequency will be detected. The switch from alternating between frequencies being detected and a constant detection of signals transmitted at 315 MHZ is represented at line 59 of FIG. 7.

Figure 8:
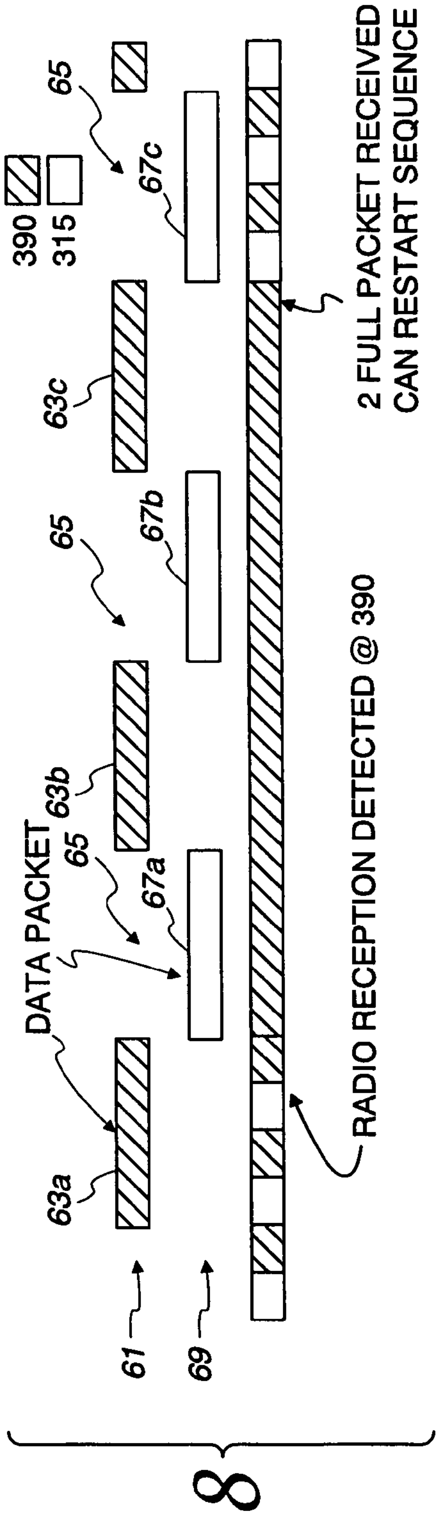
FIG. 8 is a graphical representation of an alternative to the transmission and reception shown in FIG. 7.

It may be desirable to transmit security codes with time spacing between the transmission of security code portions as is illustrated at line 61 of FIG. 8. In the example, security code portions are transmitted for a period of approximately 40 msec (63) with an approximately 60 msec guard time 65. Line 61 represents transmission at 315 MHZ. Security code portions are also transmitted at 390 MHZ in 40 msec transmissions 67 separated by approximately 60 msec (65) of no transmission. Advantageously, the transmission at one frequency occurs during the non-transmission at the other frequency. As represented in FIG. 8 the active transmission of security code portions at 315 MHZ (63*a*, 63*b*, 63*c*) occurs when active transmission at 390 MHZ (67*a*, 67*b* and 67*c*) is not occurring. In this way the security codes can be contemporaneously transmitted in a non-interfering manner simplifying the use of frequency agile transmitter and receiver circuits. Also, by operation of controller 29 of transmitter 15 substantially the same code portion will be transmitted as shown by the couplets (63*a*, 67*a*); (63*b*, 67*b*) and (63*c*, 67*c*). The reception of transmission is similar to that shown in FIG. 7 in that when valid code digits are found at one frequency e.g., 315 MHZ, the reception may convert to that frequency alone for further reception.

A system of the above described type will include one or more transmitters of the type shown in FIG. 2 and a barrier movement operator as shown in FIG. 1 which includes a multiple frequency rf receiver. As a part of the normal operating routine, the controller of the barrier movement operator alternatively checks whether there are incoming code digits at the 315 MHZ and 390 MHZ frequencies. When a user wants to gain access to the secure area he or she presses the button 27 of the transmitter to initiate code transmission. In response to the button press, controller 29 of the transmitter 15 controls the transmitter operation to contemporaneously transmit security code portions at both frequencies. The contemporaneous transmission may be as shown in FIG. 7, lines 49-51 or as shown in FIG. 8, lines 61 and 69 or other methods of contemporaneous transmission.

The receiver, which is checking for incoming security codes, will detect the presence of such a code at within 315 or 390 MHZ. Upon such detection the receiver will continue to focus on the frequency at which code presence was detected to accumulate or enter security code. The accumulated code is then validated by comparing with security codes of authorized transmitters previously stored in the barrier movement operator. Upon validation the controller 19 of receiver 11 may energize motor 23 to change the position of a barrier. As is well known in the art, other functions could also be enacted by the security code such as unlocking a barrier or enabling lights.

The preceding embodiments use multi-frequency transmitters and receivers to contemporaneously transmit security codes at a plurality of frequencies. In an alternative embodiment multi-frequency transmitters and receivers can also be used to avoid radio frequency interference by a method and arrangement for transmitting security codes at a first one of a plurality of frequencies, then, should a user indicate that the security code transmission did not provide access to the secure area, transmitting the security code at a second of a plurality of frequencies.

As a first example of the present embodiment, a user may press push button 27 to initiate the transmission of a security code. In response to the button press, the transmitter 15 obtains a security code and transmits the obtained security code at a default rf frequency. The controller 29 of the transmitter determines which of the possible rf frequencies of transmission is the default frequency by responding to user interaction. When the button press being responded to occurs within a predetermined period of time, e.g., 4-40 seconds of the last button press, the controller changes the default frequency for transmission to another of the transmitter's frequencies. A second press within the predetermined period of time is likely to indicate that the immediately prior transmission was not effective and the default frequency is changed to a second frequency to protect against rf interference. Alternatively, when the second button press occurs after the expiration of the predetermined period of time, given the results of human factors studies, it is likely that the prior transmission was successful. Accordingly, the default frequency is not changed and the second transmission is completed using the same rf frequency as the next prior transmission.

Figure 9:
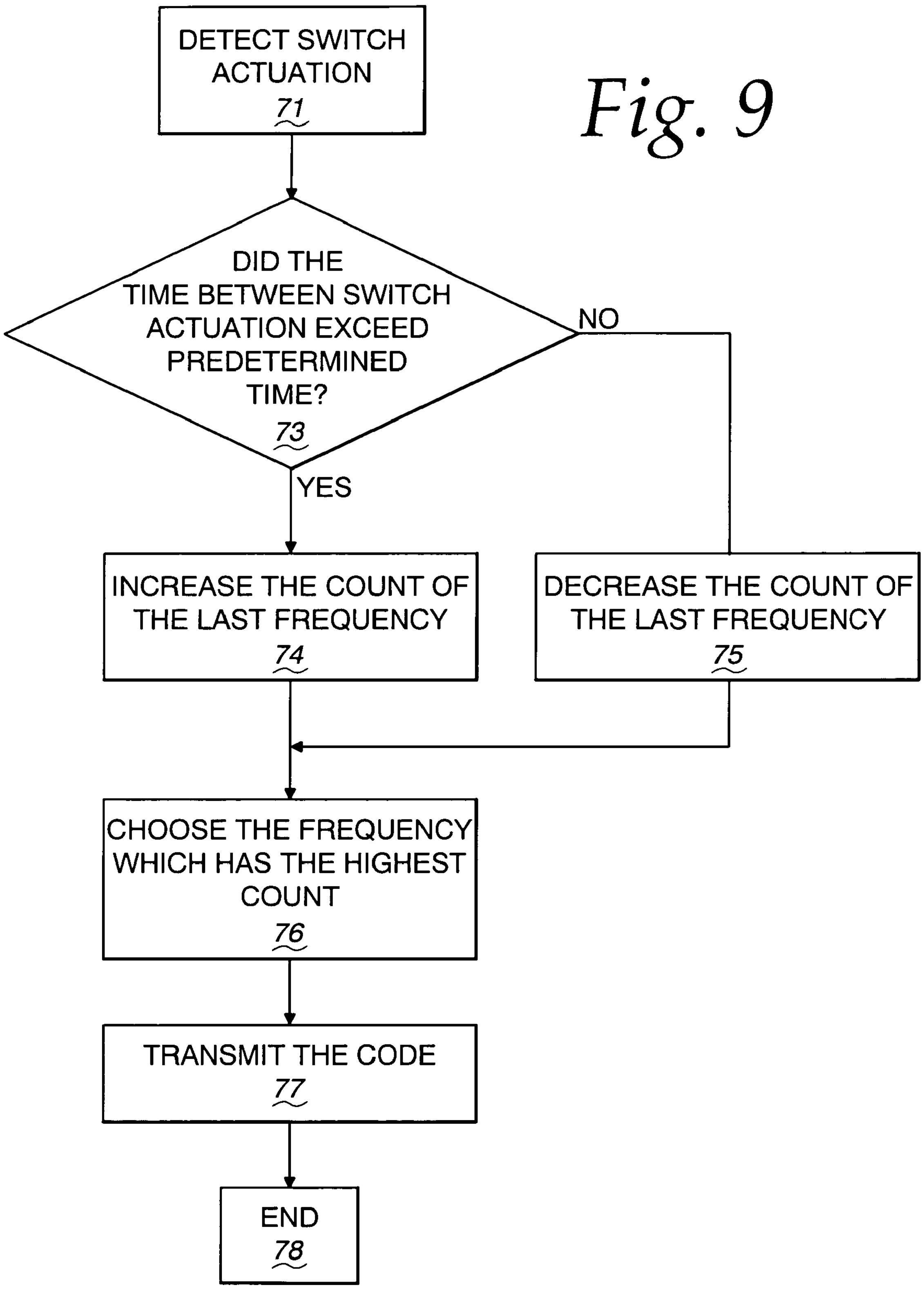
FIG. 9 is a functional flow diagram of the plurality of radio frequencies a method selecting a frequency for transmission based on a count of the plurality of radio frequencies the number of the plurality of radio frequencies usages of the plurality of radio frequencies each frequency.

FIG. 9 is a functional block diagram of a second example of operation in accordance with the second embodiment. In the example of FIG. 9 a count is maintained for each of the plurality of possible frequencies. Although the present example relates to two possible frequencies, extending the principles taught to a greater number of frequencies is within the scope of the present example. Each count is incremented or decremented based on the time that a second button actuation occurs after a first button actuation to roughly track the probable success and failure rates at each frequency. When a security code is to be transmitted, the frequency with the highest count is selected as the default frequency for transmission representing the most apparent successful uses.

FIG. 9 represents the frequency selection in a transmitter which maintains frequency usage counts and begins with a step 71 in which the user press of a switch is detected. Next, in step 73 a determination is made as to whether the time elapsed since the last switch press exceeds a predetermined time. As in the previous embodiments the predetermined time is relatively short, to reflect the differences between button presses which are made because the prior button did not seem effective and the normal rate of effective button presses. The predetermined time may, for example, be in the range of 4-40 seconds. When the elapsed time exceeds the predetermined amount, flow proceeds to step 74 in which a count value associated with the last frequency used for transmission is incremented.

Alternatively, when step 73 identifies that the elapsed time between actuations does not exceed the threshold, a step 75 is performed in which the count value associated with the last frequency used, is decremented. After either step 74 or step 75, a step 76 is performed in which the various counts for the various possible output frequencies are compared and the frequency associated with the largest count is selected. Next, the security code to be transmitted is transmitted (step 77) using the frequency selected in step 76 and this portion of the operation of the transmitter ends in block 78. It should be mentioned that step 76 will include a predetermined frequency e.g., 390 MHZ to be used when the count values for two frequencies are equal at the highest count.

Figure 10:
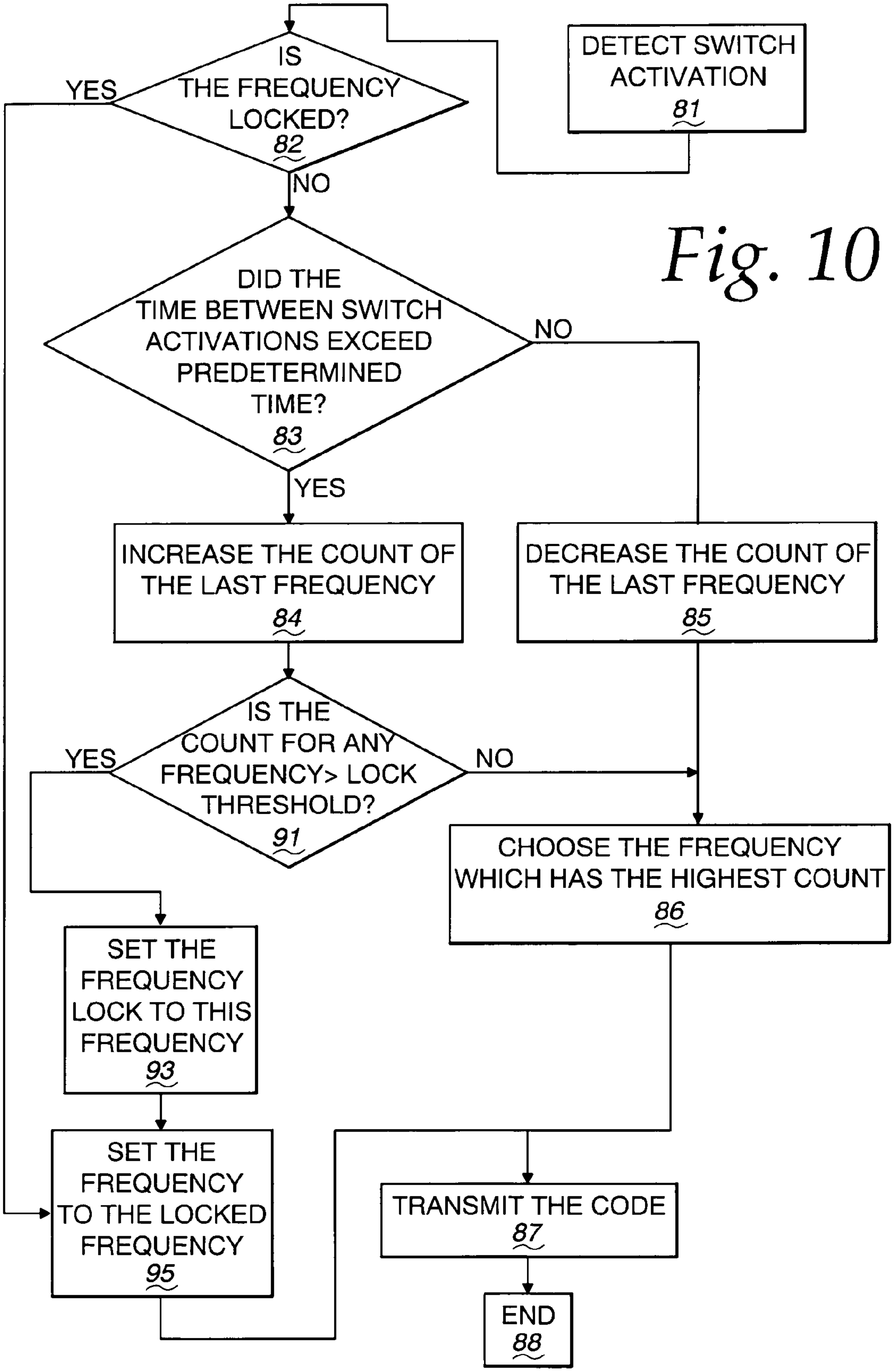
FIG. 10 is a function flow diagram of the arrangement of FIG. 9 which includes the ability to lock the transmitter into a selected frequency.

FIG. 10 is a flow diagram of transmitter operation which includes a frequency lock function in addition to the steps shown in FIG. 9. The frequency lock function allows a transmitter to semi-permanently define one frequency as the default frequency when the number successful of usages of a particular frequency indicates that it is the most likely to yield satisfactory results. FIG. 10 begins with the detection of a switch actuation in step 81 and proceeds to a decision step 82 to determine if a frequency has already been locked in the transmitter for future use. When step 82 identifies that a frequency has been locked into the transmitter for future use, flow proceeds to step 95 where the frequency for transmission is set to the locked frequency and flow continues to a step 87 in which the code is transmitted using the locked frequency. When step 82 determines that no locked frequency exists, steps 83 and 84 or 85 are performed to increment or decrement the per frequency counts as in the example of FIG. 9. Whenever the count is incremented in step 84 a decision step 91 is performed to determine whether the count for the just incremented frequency exceeds a predetermined lock threshold. When the lock threshold has been exceeded, flow proceeds step 93 in which the frequency is locked for future use and flow continues to transmit step 87 via the step 95. Whenever the count associated with a frequency is decremented in step 85 and whenever step 91 indicates that the lock threshold has not been achieved, the frequency with the highest count is selected in step 86 and transmission occurs at the selected frequency in step 87.

The decision step 91 is shown to compare the count of a frequency to a threshold to determine whether or not to lock a frequency. It should be mentioned that the step 91 may be changed to compare the counts of the frequencies and to lock in a frequency when the counts show a predominant usage of one frequency over another. Further, it is possible that the performance of the flow in FIG. 10 will lock a frequency into the transmitter at a time when no rf interference exists, but later a source of rf interference at the locked frequency arises. To protect from such, the flow diagram of FIG. 10 may be modified to unlock a locked frequency when a predetermined number of apparently non-successful transmissions have occurred so that the transmitter can begin to select frequencies as before. Another possibility is to provide a means actuatable by the user, such as a dedicated switch or a combination of switch actuations, to unlock a frequency.

While the invention herein disclosed has been described by means of specific embodiments and applications thereof, numerous modifications and variations could be made thereto by those skilled in the art without departing from the scope of the invention set forth in the claims.

What is claimed is:

1. A security code transmission system comprising:

a transmitter comprising:

a source of a security code;

rf transmission apparatus capable of transmitting at at least a first preset rf frequency and at least a second preset rf frequency; and control apparatus which obtains a security code from the source and controls the rf transmission apparatus to contemporaneously transmit portions of the obtained security code at both the at least the first and the second preset rf frequencies; and a barrier movement operator comprising:

a receiving apparatus configured to select a signal from at least two signals being transmitted at the at least two different rf frequencies, the receiving apparatus including an antenna circuit for receiving the transmitted security code from the transmitter;

a receiver configured to receive at the preset frequencies and which receiver receives the transmitted security code at the preset frequencies from the antenna circuit; and a controller which is operably coupled to the receiver, the controller configured to survey for the presence of the security code at the preset frequencies from the transmission apparatus, the receiving apparatus connected to the antenna circuit for receiving and validating the security code transmitted at the at least the first preset rf frequency and second preset rf frequency, the receiving apparatus being configured to select one of the first preset rf frequency and the second preset rf frequency based upon the reception of only a portion of the security code at either of the at least the first and second preset rf frequencies, the receiving apparatus being further configured to continue to detect a remaining portion of the security code at the selected one of the at least first and second preset rf frequencies as a default frequency to the exclusion of the other frequency for at least a complete reception of the security code and for a time thereafter.

2. A system, according to claim 1 wherein the security code is repetitively transmitted at both the first rf frequency and the second rf frequency.

3. A system, according to claim 1 wherein the rf transmission apparatus comprises first transmission circuitry for transmitting at the first rf frequency and second transmission circuitry for transmitting at the second rf frequency.

4. A system, according to claim 1 where each security code comprises a plurality of security code portions and the transmission apparatus transmits security code portions in a sequence.

5. A system in accordance with claim 4 wherein the sequence of security code portions are repetitively transmitted at both the first rf frequency and the second rf frequency.

6. A system in accordance with claim 1 wherein the transmission apparatus transmits portions of a security code at both the first and the second rf frequencies by transmitting a sequence of security code portions each separated by a non-transmission interval.

7. A system in accordance with claim 6 wherein a time duration of transmitting a code portion is less than a time interval of non-transmission.

8. A system in accordance with claim 1 wherein the transmission apparatus comprises a first transmission circuit tuned to transmit a the first rf frequency and a second transmission circuit tuned to transmit at the second rf frequency.

9. A system in accordance with claim 1 wherein the transmission apparatus comprises a controllable transmission circuit adaptable in response to the control apparatus for selectively transmitting at the first rf frequency and the second rf frequency.

10. A security code receiving apparatus comprising:

an antenna circuit configured to receive contemporaneously rf transmitted signals representing a security code;

a receiver connected to the antenna circuitry, the receiver configured to receive the contemporaneously transmitted signals at at least a first preset rf frequency and at least a second preset rf frequency; and a controller connected to the receiver, the controller configured to survey for the presence of the signals representing the security code at the preset frequencies and to select one of the first and the second preset ref frequencies based upon the reception of only a portion of the security code at either of the first and the second preset rf frequencies, the receiver configured to continue to detect the security code at the selected preset frequency as a default frequency to the exclusion of the other preset frequency for at least the complete reception of the security code at the selected preset frequency and for a time thereafter to provide access to a secured area.

11. A security code receiver according to claim 10 wherein the controller alternately surveys for reception of security codes on the first and the second frequency.

12. A security code receiver according to claim 11 wherein the controller terminates alternately surveying when the presence of a security code is received at one of the first or second frequencies.

13. A barrier movement operator comprising:

an antenna circuit which receives rf transmitted signals representative of a security code, the signals contemporaneously transmitted at least at a first defined rf frequency and at least a second defined rf frequency, the frequencies defined for transmission and receipt by a receiver prior to the broadcast thereof; and a receiving apparatus which includes the receiver which receives the contemporaneously transmitted security code from the antenna circuit; and a controller which is operably coupled to the receiver, the receiving apparatus connected to the antenna circuit, the receiving apparatus configured to identify the defined first and second rf frequencies, to receive the defined first and second rf frequencies and to validate the security code transmitted at the at least the first rf frequency and second rf frequencies, the controller configured to select one of the first and the second rf frequencies based upon the reception of only a portion of the security codes at either of the first and the second rf frequencies, the receiver configured to continue to detect security codes at the selected frequency as a default frequency to the exclusion of the other frequency for at least the complete reception of the security code at the selected frequency and for a time thereafter to provide access to a secured area.

14. A barrier movement operator according to claim 13 wherein the controller alternately surveys for reception of security codes on the first and the second frequency.

15. A barrier movement operator according to claim 14 wherein the controller terminates alternately surveying when the presence of a security code is received at one of the first or second frequencies.

* * * * *

UNITED STATES PATENT AND TRADEMARK OFFICE

CERTIFICATE OF CORRECTION

PATENT NO. : 7,589,615 B2
APPLICATION NO. : 10/994786
DATED : September 15, 2009
INVENTOR(S) : Robert R. Keller, Jr. et al.

It is certified that error appears in the above-identified patent and that said Letters Patent is hereby corrected as shown below:

Claim 8, Column 7, Line 28; after “transmit” delete “a”.

Claim 10, Column 7, Line 46; change “ref” to -- rf --.

Signed and Sealed this

First Day of December, 2009

David J. Kappos

David J. Kappos
*Director of the United States Patent and Trademark Office*

UNITED STATES PATENT AND TRADEMARK OFFICE

CERTIFICATE OF CORRECTION

PATENT NO. : 7,589,615 B2
APPLICATION NO. : 10/994786
DATED : September 15, 2009
INVENTOR(S) : Keller, Jr. et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 400 days.

Signed and Sealed this

Twenty-first Day of September, 2010

David J. Kappos
*Director of the United States Patent and Trademark Office*